US010025932B2

(12) United States Patent
Thom et al.

(10) Patent No.: US 10,025,932 B2
(45) Date of Patent: Jul. 17, 2018

(54) PORTABLE SECURITY DEVICE

(71) Applicant: Microsoft Technology Licensing, LLC, Redmond, WA (US)

(72) Inventors: Stefan Thom, Snohomish, WA (US); Ronald Aigner, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 329 days.

(21) Appl. No.: 14/610,228

(22) Filed: Jan. 30, 2015

(65) Prior Publication Data
US 2016/0226657 A1    Aug. 4, 2016

(51) Int. Cl.
*G06F 21/57* (2013.01)
*H04L 29/06* (2006.01)
*H04L 9/00* (2006.01)
*H04L 9/08* (2006.01)

(52) U.S. Cl.
CPC ............ *G06F 21/57* (2013.01); *H04L 9/003* (2013.01); *H04L 63/0428* (2013.01); *H04L 9/0897* (2013.01); *H04L 2209/24* (2013.01)

(58) Field of Classification Search
CPC . H04L 9/003; H04L 63/0428; H04L 2209/24; H04L 9/0897; G06F 21/57
See application file for complete search history.

(56) References Cited

U.S. PATENT DOCUMENTS

| 5,485,519 | A | * | 1/1996 | Weiss | G06F 21/31 |
| | | | | | 235/379 |
| 5,732,212 | A | * | 3/1998 | Perholtz | G06F 1/26 |
| | | | | | 709/224 |
| 6,092,201 | A | * | 7/2000 | Turnbull | G06F 21/51 |
| | | | | | 380/231 |
| 7,631,195 | B1 | * | 12/2009 | Yu | G06F 21/72 |
| | | | | | 713/179 |
| 8,249,257 | B2 | | 8/2012 | Brutch et al. | |

(Continued)

FOREIGN PATENT DOCUMENTS

CN    203224878    10/2013

OTHER PUBLICATIONS

Microsoft ("Trusted Platform Module Services Group Policy Settings," Sep. 5, 2013, pp. 1-8).*

(Continued)

*Primary Examiner* — Luu Pham
*Assistant Examiner* — James J Wilcox
(74) *Attorney, Agent, or Firm* — Arent Fox LLP

(57) ABSTRACT

A portable security device for a computing system includes a housing, an interface at least partially disposed within the housing, a trusted platform module within the housing that is coupled to the interface, and a controller within the housing that is coupled to the trusted platform module and the interface. The interface is configured to engage a plurality of different devices and provide communication between the portable security device and an individual device when engaged with the individual device. In some examples, the trusted platform module can receive power from the individual device via the interface when the portable security device is engaged with the individual device. The controller includes logic to detect when the portable security device is coupled to the individual device via the interface.

15 Claims, 8 Drawing Sheets

(56) References Cited

U.S. PATENT DOCUMENTS

| | | | |
|---|---|---|---|
| 8,259,948 B2 | 9/2012 | Smith et al. | |
| 8,296,841 B2 | 10/2012 | Thom et al. | |
| 8,417,967 B2 | 4/2013 | Foster et al. | |
| 8,769,331 B1* | 7/2014 | Mahalingaiah | G06F 21/44 713/500 |
| 8,898,476 B1* | 11/2014 | Lindteigen | H04L 9/0861 380/286 |
| 8,984,316 B2* | 3/2015 | Forristal | G06F 21/57 713/323 |
| 9,432,340 B1* | 8/2016 | Tutt | H04L 9/3247 |
| 9,721,086 B2* | 8/2017 | Shear | H04L 63/20 |
| 9,734,348 B2* | 8/2017 | Erofeev | G06F 21/6218 |
| 9,740,567 B2* | 8/2017 | Berengoltz | G06F 11/1448 |
| 9,749,299 B1* | 8/2017 | Sokolov | H04L 63/0428 |
| 2004/0128552 A1* | 7/2004 | Toomey | G06F 21/57 726/22 |
| 2004/0148533 A1* | 7/2004 | Nicholas | G06F 1/3228 713/320 |
| 2005/0163317 A1* | 7/2005 | Angelo | G06F 21/57 380/259 |
| 2005/0235141 A1* | 10/2005 | Ibrahim | G06F 21/57 713/164 |
| 2006/0117177 A1* | 6/2006 | Buer | G06F 21/606 713/155 |
| 2006/0179294 A1* | 8/2006 | Chu | G06F 9/4405 713/2 |
| 2007/0006169 A1* | 1/2007 | Iliev | G06F 21/57 717/131 |
| 2007/0039042 A1* | 2/2007 | Apelbaum | G06F 21/46 726/6 |
| 2007/0239990 A1* | 10/2007 | Fruhauf | G06F 21/32 713/185 |
| 2008/0060068 A1* | 3/2008 | Mabayoje | G06F 21/31 726/9 |
| 2008/0072042 A1* | 3/2008 | Okuyama | G06F 21/57 713/164 |
| 2008/0141040 A1* | 6/2008 | Biddle | G06F 11/1415 713/193 |
| 2008/0162915 A1* | 7/2008 | Price | G06F 21/568 713/2 |
| 2008/0184028 A1* | 7/2008 | Anson | G06F 21/57 713/156 |
| 2009/0049510 A1 | 2/2009 | Zhang et al. | |
| 2009/0086967 A1* | 4/2009 | Ozawa | H04L 9/0897 380/44 |
| 2009/0132816 A1 | 5/2009 | Lee | |
| 2009/0210456 A1* | 8/2009 | Subramaniam | G06F 21/57 |
| 2010/0024040 A1* | 1/2010 | Nimura | G06F 21/88 726/26 |
| 2010/0042942 A1 | 2/2010 | Vasilevsky et al. | |
| 2010/0050244 A1* | 2/2010 | Tarkhanyan | G06F 21/57 726/7 |
| 2010/0202617 A1* | 8/2010 | Balakrishnan | G06F 21/575 380/277 |
| 2011/0010470 A1* | 1/2011 | Hulbert | G06F 3/0219 710/13 |
| 2011/0099625 A1* | 4/2011 | Thom | G06F 21/34 726/18 |
| 2011/0271312 A1* | 11/2011 | Arnouse | G06F 15/02 725/106 |
| 2012/0069131 A1* | 3/2012 | Abelow | G06Q 10/067 348/14.01 |
| 2012/0151219 A1* | 6/2012 | Ryu | H04L 9/0863 713/185 |
| 2012/0151223 A1* | 6/2012 | Conde Marques | G06F 21/6218 713/193 |
| 2012/0173885 A1* | 7/2012 | Acar | G06F 21/602 713/193 |
| 2012/0246472 A1* | 9/2012 | Berengoltz | G06F 11/1448 713/165 |
| 2013/0014221 A1* | 1/2013 | Moore | G06F 21/85 726/3 |
| 2013/0308265 A1* | 11/2013 | Arnouse | H05K 7/1488 361/679.41 |
| 2014/0184266 A1* | 7/2014 | Krimon | H03K 19/003 326/8 |
| 2014/0237220 A1* | 8/2014 | O'Rourke | G06F 9/4401 713/1 |
| 2014/0281514 A1* | 9/2014 | Erofeev | G06F 21/6218 713/165 |
| 2014/0372743 A1* | 12/2014 | Rogers | H04L 9/3234 713/2 |
| 2014/0373184 A1* | 12/2014 | Mahaffey | G06F 21/88 726/35 |
| 2014/0380425 A1* | 12/2014 | Lockett | H04L 63/20 726/4 |
| 2015/0026515 A1* | 1/2015 | Arnouse | G06F 11/2023 714/10 |
| 2015/0033305 A1* | 1/2015 | Shear | G06F 21/45 726/6 |
| 2015/0067896 A1* | 3/2015 | Gundam | G06F 13/4081 726/34 |
| 2015/0163121 A1* | 6/2015 | Mahaffey | G06F 11/0766 707/687 |
| 2016/0308677 A1* | 10/2016 | Thom | H04L 9/3234 |
| 2016/0323105 A1* | 11/2016 | Lee | H04L 9/0897 |
| 2017/0155513 A1* | 6/2017 | Acar | H04L 9/3247 |
| 2017/0192928 A1* | 7/2017 | Arnouse | G06F 13/4081 |
| 2017/0230179 A1* | 8/2017 | Mannan | H04L 9/0897 |
| 2017/0293763 A1* | 10/2017 | Shear | G06F 21/57 |
| 2017/0339178 A1* | 11/2017 | Mahaffey | H04L 63/1425 |
| 2018/0067812 A1* | 3/2018 | Berengoltz | G06F 21/6218 |

OTHER PUBLICATIONS

Technet ("Windows Trusted Platform Module: Management Step by Step Guide," Apr. 27, 2011, pp. 1-7).*

Shuanghe—Design and Implementation of Portable TPM Device Driver Based on Extensible Firmware Interface, IEEE, Dec. 31, 2009, pp. 342-345.*

Zhang—A portable TPM based on USB Key, ACM, Oct. 4-8, 2010, pp. 750-752.*

PCT Search Report and Written Opinion dated Mar. 24, 2016 from corresponding PCT Appilcation Serial No. PCT/US2016/012295, 12 pages.

"USB—Wikipedia, the free encyclopedia" Jan. 29, 2015, retrieved from the Internet at «https://en.wikipedia.org/w/index.php?title=USB&oldid=644718308».

* cited by examiner

PORTABLE SECURITY DEVICE

BACKGROUND

As the use of computers has increased, the ability to manage passwords and other secure information across multiple devices has become increasingly difficult. Further, the likelihood of individual user accounts being hacked or otherwise being the victim of malicious software attacks has increased dramatically.

Conventionally, a trusted platform module (TPM) is a chip installed in a computer for which the conventional TPM securely generates cryptographic keys, and the conventional TPM limits the use of such keys on that computer. Conventional TPMs are used to authenticate the computer of which they are an inextricable part.

SUMMARY

The techniques discussed herein facilitate a portable security device for a number of computing devices. The portable security device can include a housing, an interface at least partially disposed within the housing, a trusted platform module within the housing that is coupled to the interface, and a controller within the housing that is coupled to the trusted platform module and the interface. The interface can be configured to engage a plurality of different devices and to provide communication between the portable security device and an individual device when engaged with the individual device. In at least one example, the trusted platform module included in the portable security device can receive power from the individual device via the interface when the portable security device is engaged with the individual device. In some examples, the trusted platform module included in the portable security device can receive power from a power source within the portable security device. The controller can include logic to detect when the portable security device is coupled to the individual device via the interface.

This Summary is provided to introduce a selection of concepts in a simplified form that are further described below in the Detailed Description. This Summary is intended to be used as an aid in determining the scope of the claimed subject matter. The term "techniques," for instance, can refer to system(s), method(s), computer-readable media/instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
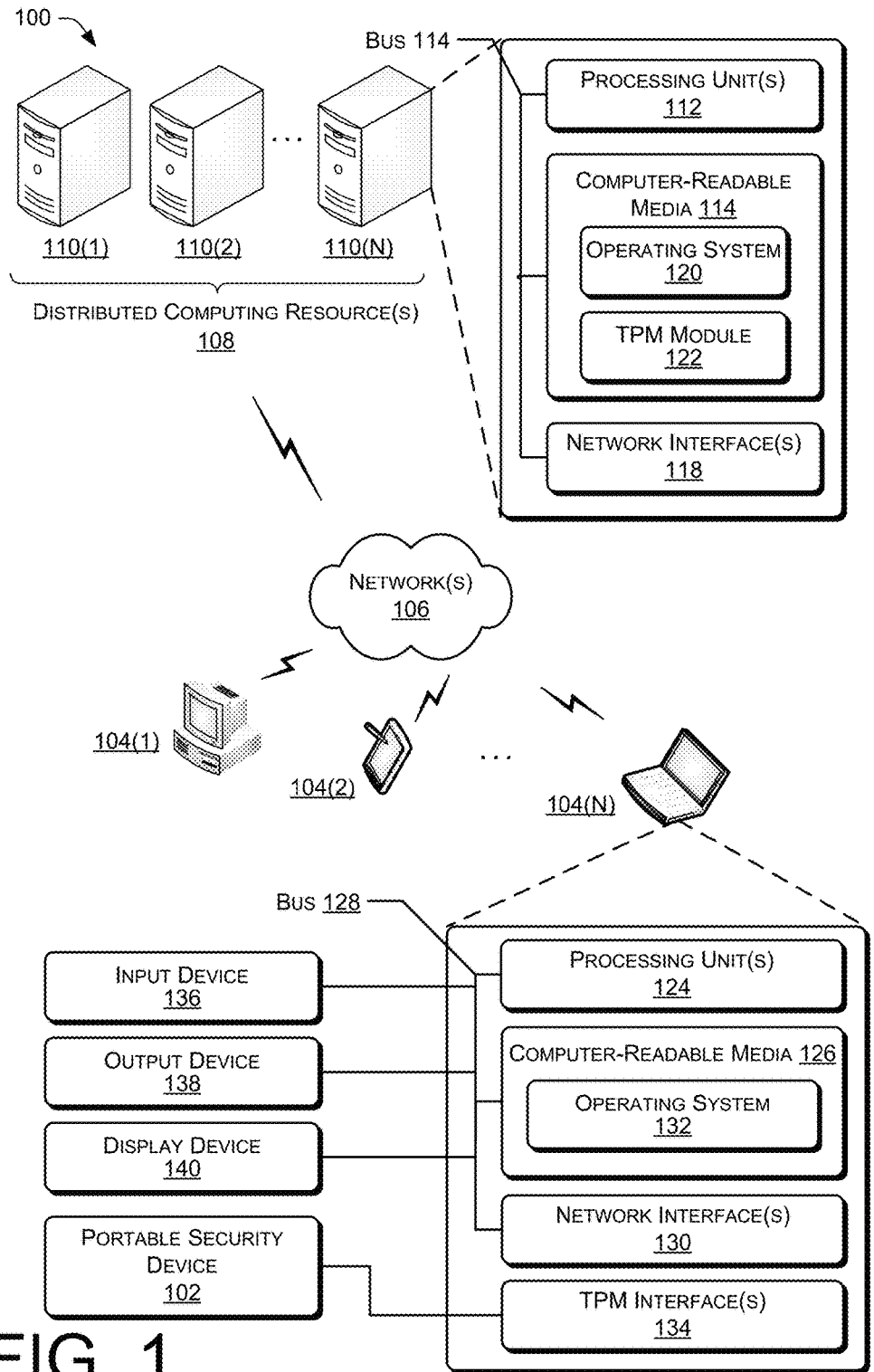
FIG. 1 is a block diagram depicting an example environment for utilizing a portable security device as described herein.

Described herein are a portable security device including secure hardware such as a trusted platform module (TPM), an example system in which the portable security device can be used, and a method of using the portable security device. The portable security device includes a TPM therein and the portable security device can be associated with multiple devices to provide data encryption and other secure computing services to each of the multiple associated devices. In some examples the multiple devices are each associated with a particular entity, e.g., user, business, organization, etc.

In particular, the portable security device can provide a random number generator, can securely generate cryptographic keys and can limit the use of such cryptographic keys. The portable security device can also provide remote attestation and sealed storage. For example, with respect to remote attestation, the portable security device can create a nearly unforgeable hash key summary of the hardware and software configuration of the associated device. In at least one example, the associated device can provide the hash key summary to a third party to verify that software on the associated device has not been altered.

In some examples, the portable security device can bind data by encrypting the data using a secure hardware bind key, e.g., a TPM bind key. The secure hardware bind key can include a unique cryptographic key, such as a unique Rivest, Shamir, and Adleman (RSA) key descended from a storage key. With respect to sealing, the portable security device can encrypt data using a similar process to the process that is used to bind data. The portable security device can further specify a state, or condition, associated with the portable security device and the portable security device can decrypt the encrypted data when the portable security device satisfies the state or condition. Various software programs installed in a device to which the portable security device is engaged can use the portable security device to authenticate hardware devices within the device. Further, secure hardware, such as a TPM, within the portable security device includes a unique and secret cryptographic key, such as an RSA key, burned in to the secure hardware as it is manufactured, which can enable the portable security device to perform platform authentication.

In general, moving the security down to a hardware level, e.g., on the portable security device, in conjunction with software can provide more protection than a software-only solution. Further, if all encryption and/or decryption is performed at the portable security device and all keys used in the portable security device are not accessible on a bus or to an external program, vulnerability of keys is minimized and can be substantially eliminated. As such, TPM keys need not be provided to particular software applications to perform encryption and decryption operations.

In at least one example, the portable security device can be used to create a "chain of trust" and to remotely attest that a particular device to which the portable security device is attached has a particular specified hardware platform and is using particular specified software. Additionally, the portable security device can assure the integrity of a particular platform within a device. As such, the portable security device can ensure that the platform has not been compromised and can start a power-on boot process for the engaged device in a trusted condition. The portable security device can extend this trusted condition until the operating system of the engaged device has fully booted and/or until applications are running on the engaged device. In association with the BIOS of the attached device, the portable security device can form a "root of trust" for the engaged device. Specifically, the portable security device can include several platform configuration registers (PCRs) that can provide for secure storage of security relevant platform metrics. The portable security device can use these platform metrics to detect changes compared to previous configurations of the platform of the engaged device. The portable security device can employ the platform metrics to inform decisions on how to proceed during the boot cycle of the engaged device.

Accordingly, the portable security device can assure platform integrity for the BIOS and the operating system. Thereafter, applications running on the device while the portable security device is engaged can rely on security characteristics, such as secure input/output, uncompromised keyboard entries, uncompromised memory and storage operations, or any combination thereof. In another aspect, disk encryption applications can use the portable security device to protect the encryption keys used to encrypt the hard disk(s) within the engaged device and to provide integrity authentication for a trusted boot pathway, e.g., BIOS, boot sector, etc. of the engaged device.

The portable security device can also be used to facilitate password protection. For example, the portable security device can provide a more secure authentication mechanism than software-based solutions that are prone to dictionary attacks. The portable security device can provide a dedicated hardware module that can serve as a dictionary attack prevention mechanism to augment security for access to encryption keys, data, system resources, etc. This dictionary attack prevention mechanism can substantially protect against guessing or automated dictionary attacks, while still allowing the user a defined number of tries to input an accepted instruction, such as an acceptable biometric, a correct password, etc., which can be particularly useful since moving between devices tends to increase the number of incorrect entries due to different modes of input including via game controllers, remote controls, etc. and due to different keypad configurations including generally smaller keys for entry on mobile devices. With hardware based dictionary attack prevention from the portable security device, the user can opt for shorter or weaker passwords which are more memorable and easier to enter across a number of devices and interfaces. Conversely, without such hardware-based protection provided by the portable TPM module, passwords with high complexity are needed to provide sufficient protection.

The portable security device can also be used for digital rights management, protection and enforcement of software licenses, prevention of cheating in online games, secure transaction processing, secure banking, secure purchasing online, secure purchasing at a point of sale terminal, etc.

In various instances, a processing unit, or units, can be configured via programming from modules or APIs to perform the techniques, or processes, as described herein. The processing unit, or units, can include one or more of a GPU, a field-programmable gate array (FPGA), another class of digital signal processor (DSP), or other hardware logic components that can, in some instances, be driven by the CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, a TPM computing system employing a portable security device as described herein can include one or more local client computing devices and one or more remote computing resources. A portable security device can be engaged with a device, e.g. attached to a local client computing device, to provide one or more of the secure computing services, described herein, at the local client computing device. In various examples, a portable security device can be engaged with a point of sale (POS) terminal in order to provide enhanced security when paying for goods or services. In addition, the portable security device can be engaged with an automated teller machine (ATM) in order to provide enhanced security when conducting banking transactions. In at least one example, the portable security device can be used to provide enhanced security when conducting online transactions via a device to which the portable security device is engaged. The remote, or distributed, computing resource, the local client computing device, the portable security device, or a combination thereof, can include one or more computer-readable media, various modules, and one or more processors that can execute one or more of the operations described herein.

Example Environment

FIG. 1, illustrates example environment 100 including a trusted platform module (TPM) computing system. As depicted, environment 100 can include at least one portable security device 102, which can be engaged with a computing device 104, e.g., a client computing device. As mentioned above, an individual portable security device 102 can operate to secure a number of individual computing devices 104 when the computing devices are engaged with the portable security device 102. The portable security device 102 and/or the computing devices 104 can be connected to at least one network 106. An individual portable security device 102 can operate to secure transactions with distributed computing resources 108 over a network 106. For example, the network 106 can include public networks such as the Internet, private networks such as an institutional and/or personal intranet, or some combination of private and public networks. The network 102 can also include any type of wired network, wireless network, or a combination thereof. Further, the wireless network can include, for example, a satellite network, a cellular network (e.g., 3G, 4G, etc.), a Wi-Fi network, a WiMax network, another wireless network, or a combination thereof. Moreover, the wired network can include an Ethernet connected via Cat-5 cable, twisted pair telephone lines, coaxial cable, fiber optic cable, or a combination thereof. In another implementation, the network 102 can be a wide area network (WAN), a local area network (LAN), or a combination thereof. Further, the network 102 can include a plain-old telephone service (POTS) network.

The network 106 can utilize communications protocols, including packet-based and/or datagram-based protocols such as internet protocol (IP), transmission control protocol (TCP), user datagram protocol (UDP), or other types of protocols. Moreover, the network 106 can also include a number of devices that facilitate network communications and/or form a hardware basis for the networks, such as switches, routers, gateways, access points, firewalls, base stations, repeaters, backbone devices, and the like.

In some examples, the network 106 can further include one or more devices that enable connection to a wireless network, such as a wireless access point (WAP). Additional examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

As further illustrated in FIG. 1, the environment 100 can also include distributed computing resources 108 connected to the network 106. In various examples, the distributed computing resources 108 can include one or more computing devices 110 that operate in a cluster or other grouped configuration to share resources, balance load, increase performance, provide fail-over support or redundancy, or for other purposes. The distributed computing resources 108 can also include computing devices 110 that can belong to a variety of categories or classes of devices such as traditional server-type devices, desktop computer-type devices, mobile-type devices, special purpose-type devices, embedded-type devices, and/or wearable-type devices.

Thus, the distributed computing resources, 108 can include a diverse variety of device types and are not limited to a particular type of device. The distributed computing resources 108 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

FIG. 1 further illustrates the details regarding an example computing device 110 of distributed computing resource 108.

As shown, the computing device 110 of distributed computing resource 108 can include one or more processing units 112 operably, or electrically, connected to computer-readable media 114, e.g., via a bus 116. The bus 116 can include one or more of a system bus, a data bus, an address bus, a PCI bus, a Mini-PCI bus, and any variety of local, peripheral, and/or independent buses.

The computing device 110 of distributed computing resource 108 can also include one or more network interfaces 118 to enable communications between the distributed computing resources 108 and/or other computing resources or devices, such as devices 104 via the network 106. The network interface 118 can include one or more network interface controllers (NICs) or other types of transceiver devices to send and receive communications over a network. In a particular aspect, as illustrated in FIG. 1, executable instructions can be stored on the computer-readable media 114 and those instructions can include, for example, an operating system 120, a TPM module 122, and other modules, programs, or applications that are loadable and executable by the one or more processing units 112.

Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU core embedded in an FPGA fabric.

For simplicity, other components or features that can be typically associated, or included, with a computing device 110 of the distributed computing resource 108 are omitted from the depiction of the device 110 in FIG. 1. These other components or features can include, but are not limited to, an A/C power supply, a D/C power supply, various connector ports, various cords, various LED indicators, speakers, a housing, a chassis, fans, heat sinks, input devices, output devices, display devices, etc.

FIG. 1 further indicates that the environment 100 can include a number of other computing devices 104, such as end user or client computing devices. The computing devices 104 can belong to a variety of categories or classes of devices, which can be the same as or different from the computing devices 110 of distributed computing resources 108. These categories or classes of devices can include traditional client-type devices, desktop computer-type devices, mobile-type devices, special purpose-type devices, embedded-type devices, and/or wearable-type devices. Further, the computing devices 104 can include a diverse variety of device types and are not limited to any particular type of device.

For example, the computing devices 104 can also include, but are not limited to, computer navigation type client computing devices such as satellite-based navigation systems including global positioning system (GPS) devices and other satellite-based navigation system devices, telecommunication devices such as mobile phones, tablet computers, mobile phone tablet hybrid devices, personal data assistants (PDAs), laptop computers, other mobile computers, wearable computers, implanted computing devices, desktop computers, personal computers, automotive computers, network-enabled televisions, thin clients, terminals, game consoles, gaming devices, work stations, media players, personal video recorders (PVRs), television set-top boxes, digital video recorders (DVRs), cameras, integrated components for inclusion in a computing device, appliances, or any other sort of computing device configured to receive user input for which security may be desired.

Moreover, an entity, such as a user, can be associated with each, or any, of the client computing devices 104. The entity can include a particular user and one or more designees of the user such as an assistant of the user, a supervisor of the user, a spouse of the user, a parent of the user, and/or another entity to whom the user grants permission to access the client computing device 104.

FIG. 1 further illustrates the details regarding an example computing device 104.

As depicted, the computing device 104 can be any computing device and can include one or more processing units 124 operably connected to computer-readable media 126, e.g., via a bus 128. The bus 128 can include one or more of a system bus, a data bus, an address bus, a PCI bus, a Mini-PCI bus, and any variety of local, peripheral, and/or independent buses.

The computing device 104 can also include one or more network interfaces 130 to enable communications between the computing device 104 and other computing resources or devices via the network 106. The network interface 130 can include one or more network interface controllers (NICs) or other types of transceiver devices to send and receive communications over a network. In a particular aspect, executable instructions can be stored on the computer-readable media 126 of the computing device 104 and those instructions, as illustrated in FIG. 1, can include, for example, an operating system 132 and other modules, programs, or applications that are loadable and executable by the one or more processing units 124.

Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU core embedded in an FPGA fabric.

FIG. 1 further indicates that the computing device 104 can include a TPM interface 134 and the TPM interface 134 can be operably coupled to the processing unit 124 and computer-readable media 126 of the computing device 104. The TPM interface 134 can include a wired interface or a wireless interface. The wired interface can include a mechanical connection such as a Universal Serial Bus (USB) connection or another plug or socket. The wireless interface can include a wireless interface capable of exchanging data over short distances. For example, the wireless interface can be an interface that operates on short-wavelength ultra-high frequency radio waves, such as that provided for in the Bluetooth standard. In another aspect, the wireless interface can be an interface based on the IEEE 802.11 standards, i.e., a Wi-Fi interface. Further, the wireless interface can include a near-field communication (NFC) interface that is established based on the NFC standards.

As illustrated, the environment 100 can further include a portable security device 102. The portable security device 102 can be engaged with the computing device 104 via the TPM interface 134 in order to provide encryption and other TPM secured computing services to the operating system 132 and other programs within the computer-readable media 126. The portable security device 102 can include an onboard TPM that can be used to provide encryption of data and other secure services for one or more software applications and/or hardware components within an engaged computing device 104.

Still referring to FIG. 1, the computing device 104 can also include an input device 136, an output device 138, a display device 140, or a combination thereof connected thereto. In particular, the input device 136, the output device 138, and the display device 140 can be connected to the bus 128. The input device 136, the output device 138, and the display device 140 can provide an ability to communicate with the computing device 104. The input device 136 can include a mouse, a keyboard, a microphone, a camera, a touch screen, a joystick, a hand held controller, a light pen, a track ball, a scanner, a graphic tablet, magnetic ink card reader (MICR), an optical character reader (OCR), a bar code reader, an optical mark reader, or a combination thereof. The output device 138 can include a printer, a speaker, a haptic device, or a combination thereof. The display device 140 can include a screen, a monitor, a projector, or a combination thereof.

Computer-readable media 114 and 126 can include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data.

Thus, the computer-readable media 114 and 126 includes computer storage media as tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), mask read-only memory (MROM), programmable read-only memory (PROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media includes computer-readable instructions, data structures, program modules, or other data carried in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

For simplicity, other components or features that can be typically associated, or included, with a computing device such as the computing device 104 are omitted from the depiction of the computing device 104 in FIG. 1. These other components or features can include, but are not limited to, an A/C power supply, a D/C power supply, various connector ports, various cords, various LED indicators, a housing, a chassis, fans, heat sinks, etc.

The computer-readable media 114 and 126 can be used to store any number of functional components that are executable by the one or more processing units 112 and 124. In many implementations, these functional components comprise instructions or programs that are executable by the one or more processing units 112 and 124 and that, when executed, implement operational logic for performing the operations attributed to the environment 100.

In various examples, one or more computing devices 110 of the distributed computing resources 108 can provide online banking services, online shopping, online entertainment, or a combination thereof. Moreover, the one or more computing devices 104 can include a personal computing device, an automated teller machine (ATM), a point of sale (POS) terminal, an electronic kiosk, a dummy terminal, or a combination thereof. The portable security device 102 can interact with the one or more computing devices 110 of the distributed computing resources 108 directly, or indirectly, via the one or more client computing devices 104 in order to authenticate a user of the portable security device 102 prior to conducting a transaction with the one or more computing devices 110 of the distributed computing resource 108. The portable security device 102 can also be used to authenticate a provider of an online service associated with the one or more distributed computing resources 108.

Example Portable Security Device

Figure 2:
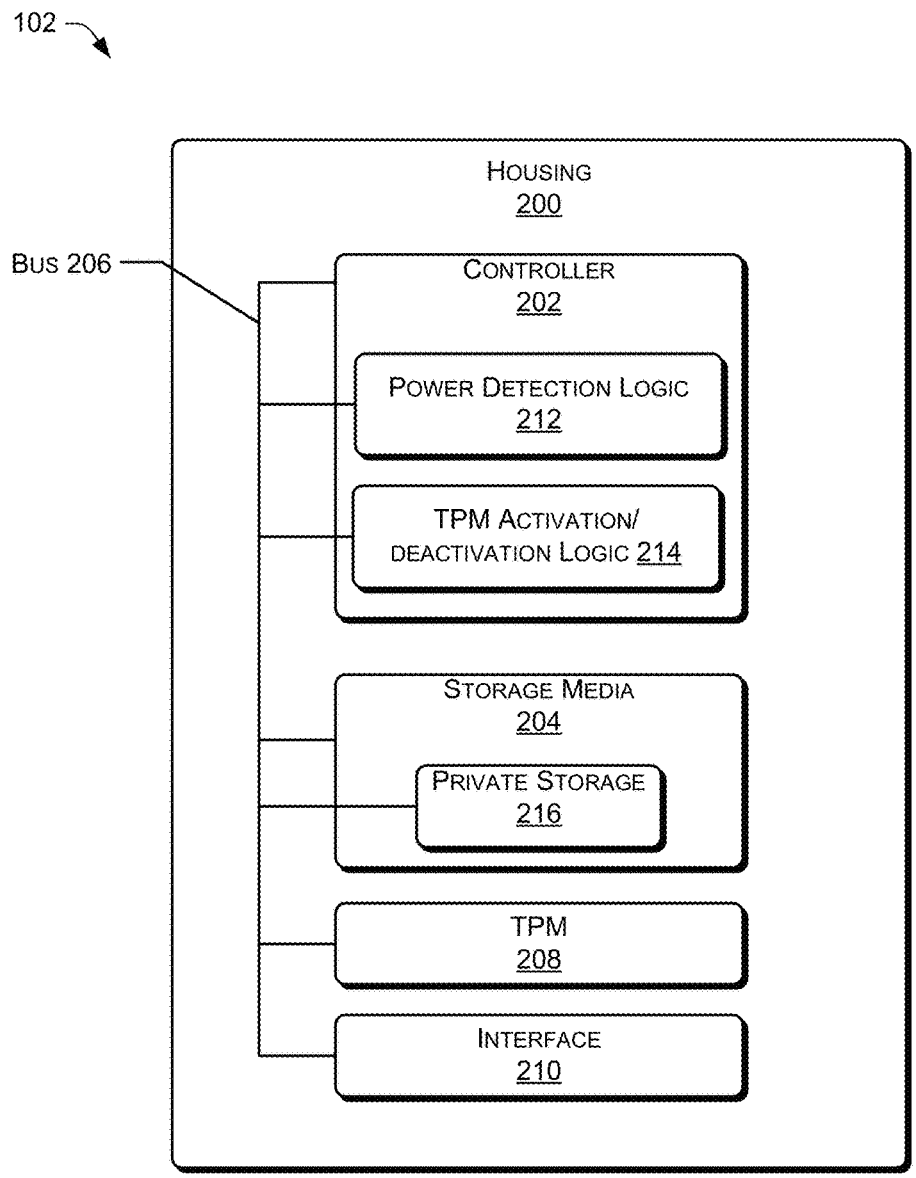
FIG. 2 is a block diagram depicting an example portable security device as described herein.

Referring now to FIG. 2 illustrates details of a portable security device 102 (initially presented in FIG. 1). As shown, the portable security device 102 can include a housing 200. The housing 200 can have a relatively small form factor and can be made from plastic, metal, composite materials, or a combination thereof. The plastic can include a thermoplastic polymer, a thermosetting polymer, a fiber-reinforced polymer, or a combination thereof. For example, the thermoplastic polymer can include poly methyl methacrylate (PMMA), polyamide, polybenzimidazole, polyethylene, polypropylene, polystyrene, polyvinyl chloride (PVC), polytetrafluoroethylene (PTFE), another thermoplastic polymer, or a combination thereof. For example, a thermosetting polymer, can include polyester resin, polyurethane, vulcanized rubber, phenol-formaldehyde resin, polymethylene, melamine, diallyl-phthalate (DAP), epoxy resin, polyimide, polycyanurate, another thermosetting polymer, or a combination thereof such as fibers including carbon, aramid, or glass fibers bound with a thermoset resin or a thermoplastic polymer.

The metal can include a pure metal, a metal alloy, or a combination thereof. The pure metal, for example, can include iron, aluminum, copper, silver, gold, some other metal, or a combination thereof. Moreover, for example, the metal alloy can include steel, bronze, brass, pewter, another alloy, or a combination thereof. Further, the housing 200 can be made using a stamping process, a molding process, an injection molding process, a spin molding process, an extrusion molding process, a compression molding process, some other process, or a combination thereof.

As depicted in FIG. 2, the portable security device 102 can include a controller 202 within the housing 200. In various examples, the controller 202 can include a microcontroller device, a digital signal processor (DSP) device, a field-programmable gate array (FPGA) device, an application-specific integrated circuit (ASIC), a system-on-a-chip (SOC), a programmable logic device (PLD), a complex programmable logic device (CPLD), a programmable logic array (PLA) device, a programmable array logic (PAL) device, a generic array logic (GAL) device, a programmable electrically erasable logic (PEEL) device, another hardware logic component, or a combination thereof.

One or more storage media 204 can be electrically, or operably, connected to the controller 202 via a bus 206. The bus 206 can include one or more of a system bus, a data bus, an address bus, a PCI bus, a Mini-PCI bus, and any variety of local, peripheral, and/or independent buses.

The one or more storage media 204 can include tangible and/or physical forms of computer storage media as discussed above regarding computer-readable media 114 and 126. However, storage media 204 is included in housing 200 of portable security device 102.

As indicated in FIG. 2, the portable security device 102 can include a TPM 208 within the housing and the TPM 208 can be operably connected to the controller 202 via the bus 206. In general, the TPM 208 can include a microchip that is designed to provide security functions for devices to which the portable security device 102 is engaged. For example, the TPM 208 can provide integrity metric measurements, secure storage of the metric measurements (or hashes thereof), authentication, key creation, key storage, key migration, encryption/decryption of data and keys, attestation and signing to the operating system or other programs of a device 104.

Moreover, when the portable security device 102 is engaged with a device, e.g., one or more of the client computing devices 104, the TPM 208 the device can have the ability to create cryptographic keys and encrypt those keys so that the keys can only be decrypted by the TPM 208. This "wrapping" or "binding" of the key can substantially protect the key from disclosure to malicious software or a malicious hardware component that has been hijacked. In some examples, the TPM 208 can include a root "wrapping" key, i.e., a storage root key (SRK), which is stored within the TPM 208. A private portion of a key that is created using the TPM 208 is not exposed to another hardware component, software component, process, person, or a combination thereof.

As illustrated in FIG. 2, the portable security device 102 can also include an interface 210 that can be operably connected to the controller 202 via the bus 206. The interface 210 can include a wired interface or a wireless interface. The wired interface can include a mechanical connection such as a Universal Serial Bus (USB) connection or another plug or a socket. The wireless interface can include a wireless interface capable of exchanging data over short distances. For example, the wireless interface can be an interface that relies on short-wavelength ultra-high frequency radio waves, such as, that provided for in the Bluetooth standard. In another aspect, the wireless interface can be an interface based on the IEEE 802.11 standards, i.e., a Wi-Fi interface. Further, the wireless interface can include a near-field communication (NFC) interface that is established based on the NFC standards.

Accordingly, when the portable security device 102 is engaged with a device, e.g., one or more of the computing devices 104, the interface 210 of the portable security device 102 can be engaged with the TPM interface 134 of the computing device 104. Once the computing device 104 and the portable security device 102 are powered on, the TPM 208 within the portable security device 102 can communicate with the processing unit 124, computer-readable media 126, operating system 132, or a combination thereof, of the computing device 104 in order to provide encryption services to the computing device 104. When the portable security device 102 is disengaged from the computing device 104, the computing device 104 may no longer be capable of providing TPM services.

As illustrated in FIG. 2, the controller 202 can include power detection logic 212. The power detection logic 212 can detect when the portable security device 102 is powered on. The portable security device 102 can receive power from a source connected directly to the portable security device 102. The portable security device 102 can also receive power indirectly from a device 104 when the portable security device 102 is engaged with the device 104. FIG. 2 also indicates that the controller 202 can include TPM activation/deactivation logic 214. Accordingly, when the power detection logic 212 detects that the portable security device 102 is receiving power, the power detection logic 212 can send a signal to the activation/deactivation logic 214 and the activation/deactivation logic 214 can activate the TPM 208 within the portable security device 102.

As further illustrated in FIG. 2, the storage media 204 within the portable security device 102 can be partitioned to include private storage 216. The private storage 216 can be used in conjunction with the TPM 208 in order to store private keys and other private data not to be provided to a user or to a device engaged with the portable security device 102.

Figure 3:
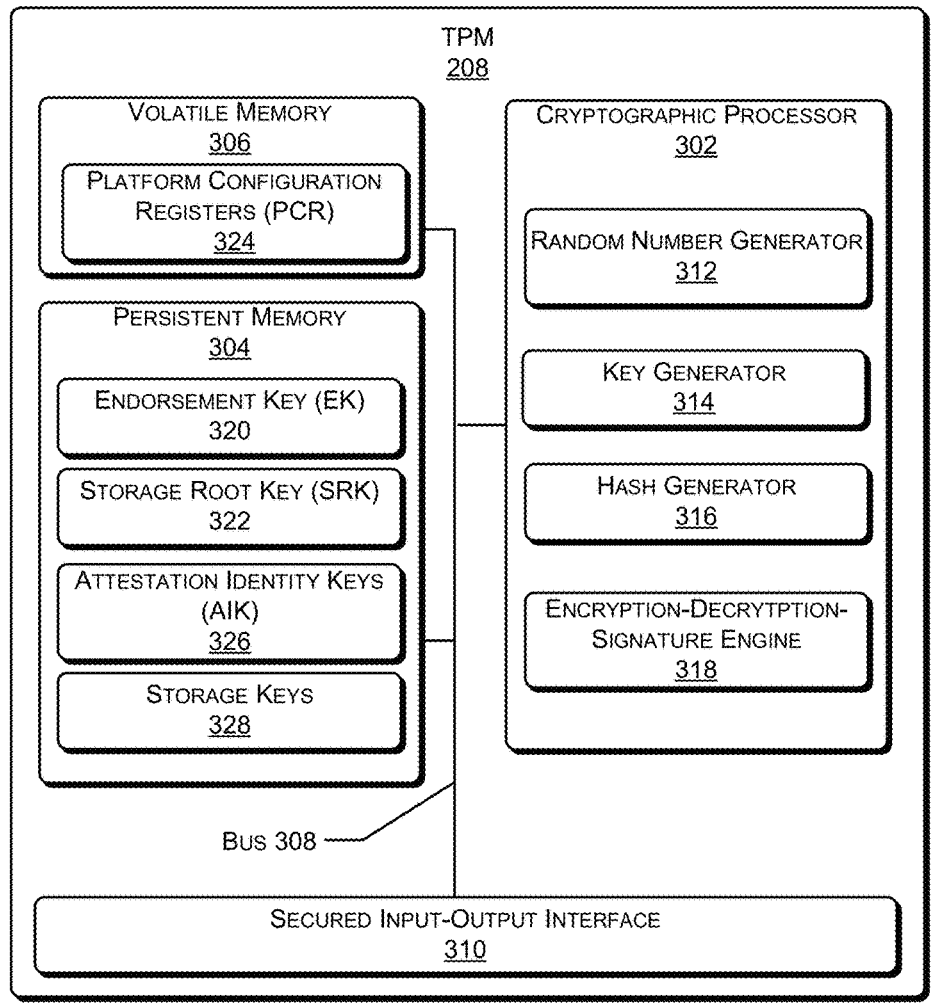
FIG. 3 is a block diagram depicting an example trusted platform module within a portable security device as described herein.

FIG. 3 illustrates details of the TPM 208. The TPM 208 can include a cryptographic processor 302, a persistent memory 304, and a volatile memory 306. The persistent memory 304 and volatile memory 306 are accessible to the cryptographic processor 302, for example, via a bus 308. In some examples, volatile memory 306 and persistent memory 304 can use the same bus, to communicate with the cryptographic processor 302. In other examples, volatile memory 306 and persistent memory 304 can each have a separate bus to communicate with the cryptographic processor 302. The bus 308 can include one or more of a system bus, a data bus, an address bus, a PCI bus, a Mini-PCI bus, and any variety of local, peripheral, and/or independent buses. The TPM 208 can also include a secured input-output interface 310.

In at least one example, the cryptographic processor 302 can include a microcontroller device, a digital signal processor (DSP) device, a field-programmable gate array (FPGA) device, an application-specific integrated circuit (ASIC), a system-on-a-chip (SOC), a programmable logic device (PLD), a complex programmable logic device (CPLD), a programmable logic array (PLA) device, a programmable array logic (PAL) device, a generic array logic (GAL) device, a programmable electrically erasable logic (PEEL) device, some other hardware logic component, or a combination thereof.

As illustrated, the cryptographic processor 302 can include a random number generator 312, a key generator 314, a hash generator 316, and an encryption-decryption signature engine 318. The random number generator 312 can include a computational or physical device that can generate a sequence of numbers or symbols that appear to lack any pattern and appear random. The key generator 314 can include a computational or physical device that can be used to generate a public key and a private key used for encrypting data. In some examples the public and private key pairs are based on the RSA algorithm developed by Ron Rivest, Adi Shamir, and Leonard Adleman. The RSA algorithm is well known in the field of cryptography and relies on two distinct prime numbers chosen at random using the random number generator 312. These two prime numbers can then be used by the key generator 314 to generate the public key and the private key using the RSA algorithm. In various examples, the key generator 314 can use another algorithm to generate the key pairs.

The hash generator 316 within the cryptographic processor 302 can be used to hash values that are stored within a platform configuration register (PCR), described below, within the volatile memory 306. The hash generator 316 can compute one or more hashes using a cryptographic hash function such as secure hash algorithm 1 (SHA-1) or another hashing algorithm. The encryption-decryption engine 318 can be used to encrypt data, decrypt data, sign PCR values, or a combination thereof.

The persistent memory 304 can include any computer storage medium that can store data structures in a manner that the data structures can be accessed using memory instructions or a memory application program interface (API) even after the process that created the data structure ends. For example, the persistent memory 304 can represent a non-volatile memory. Such as read-only memory (ROM), flash memory, ferroelectric random access memory (F-RAM), magnetoresistive RAM, any magnetic storage memory, or a combination thereof. As illustrated in FIG. 3, the persistent memory 304 can be used to store an endorsement key (EK) 320 and a storage root key (SRK) 322.

In at least one example, the EK 320 can include a 2048-bit RSA private key that is generated at the time of manufacture of the TPM 208 and is hard encoded onto the TPM 208 and stored within the persistent memory 304. Alternatively, the EK 320 can be generated the first time ownership is taken of the TPM 208, e.g., when the portable security device 102 in which the TPM 208 is installed is first engaged with a device and initialized. The EK 320 may not be revealed to the user and stays in the TPM 208 during the lifetime of the TPM 208. To preserve the privacy of a user, the EK 320 can be used to decrypt data, but not to encrypt data.

In some examples, the SRK 322, like the EK 320, can be a 2048-bit private key, such as an RSA key, that can be generated at the time of taking ownership of the TPM 208 by the user. The SRK 322 can be used thereafter until the TPM 208 is cleared—if the TPM 208 is cleared. The SRK 322 remains on the TPM 208 and may not be revealed to the user.

The volatile memory 306 can include any memory that loses content when disconnected from power. For example, the volatile memory can include random access memory (RAM). The RAM can include static RAM (SRAM) or dynamic RAM (DRAM). The volatile memory 306 can be used store measurement data and private keys. For example, the volatile memory 306 can include one or more platform configuration registers (PCRs) 324. The PCRs 324 can allow a secure storage and reporting of security metrics. These metrics can be used to detect changes to previous configurations in the engaged device and derive decisions on proceeding during a power on boot process.

For example, hash values associated with the metrics can be stored within the PCRs 324. In a particular aspect, based on the current TPM standard, the volatile memory 306 can include twenty-four (24) PCRs 324. The hash values stored within the PCRs 324 can be changed using an extend operation. In order to store new values in a particular PCR 324, the extend operation can be used to append a new value to a current value in the PCR 324, compute a new hash, and replace the current value within the PCR 324 with the output of the hash operation. The new hash can be computed by the hash generator from the concatenation of the new value and the current value.

Accordingly, each hash value for a particular metric can be a hash of an array of bytes, which can be either code about to be loaded or a hash of it, appended to the previous PCR value and stored back to the PCR 324. The output of the hash generator 314 can be defined by the hashing algorithm used in the hash generator. For instance, the output can include a 20 byte value for SHA-1. The relatively small size of the hash values allows the TPM 208 to store all hash values associated with the relevant metrics a very small memory footprint. During operation, a slight change in the bits used to generate the hash keys will result in different hash values. For example, a change in even one bit input to the hash generator 316 will result in approximately half of the output bits changing. This promulgation helps detect even a slight change in the software components or hardware components that are loaded, or otherwise made operational, during a boot cycle of a device to which the portable security device 102 is engaged.

As such, the TPM 208 can assure the integrity of a platform associated with an engaged device. The platform can include any computer platform and any operating system of a device 104 engaged with a portable security device 102. The TPM 208 can start the power-on boot process from a trusted condition and extend this trust until the particular operating system is fully booted and the relevant applications are running.

The TPM 208 can include a plurality of attestation identity keys (AIKs) 326 within the persistent memory 304. The AIKs 326 provide a summary of the hardware and software configuration within the engaged device. For example, a particular encrypted AIK 326 associated with a particular software program can be submitted to a third party verifier that can decrypt the AIK 326 and verify that the particular software program is unaltered and not malicious to the engaged device 104. If the particular software program is altered, and potentially malicious, the third party verifier can return an encrypted warning that can be decrypted by the TPM 208 and presented via a display associated with the engaged device 104.

In another example, a user can wish to anonymously communicate with another device, but in order to do so, the user must first prove that the user is communicating using a trusted device. The user can request an AIK 326 that can indicate that the user has been certified by a neutral, trusted certification authority. In order to obtain certification, the TPM 208 can send a number of credentials, e.g., a public key credential, a platform credential, and/or a conformance credential. These credentials can identify the platform of the engaged device 104, model, what kind of software is currently being used on the platform, details of the TPM 208, and that the platform complies with the Trusted Computing Group TCG specifications. In order to maintain anonymity, these credentials can be sent to the trusted third party privacy certification authority. The certification authority can verify the credentials. If the credentials are verified, the certification authority can create a certified secondary key pair AIK and return this credential to the requestor. When the engaged device 104 or the TPM receives the certified AIK, the engaged device 104 can use it to communicate anonymously with other trusted platforms.

As illustrated in FIG. 3 the portable TPM device 208 of the portable security device 102 can include a plurality of storage keys 328 within the persistent memory 306. In various examples, the portable TPM 208 can bind data by encrypting the data using a TPM bind key. The TPM bind key can include a unique key, such as an RSA key, descended from a particular storage key within the storage keys 328 stored in the persistent memory 306 of the portable TPM 208. The portable TPM 208 can also seal data by first encrypting data using a similar process as binding data. However, the portable TPM 208 can further specify a state, or condition, associated with the portable TPM 208 and can configure the portable TPM 208 to decrypt the encrypted data when the portable TPM 208 satisfies the state or condition.

Example Processes

Figure 4:
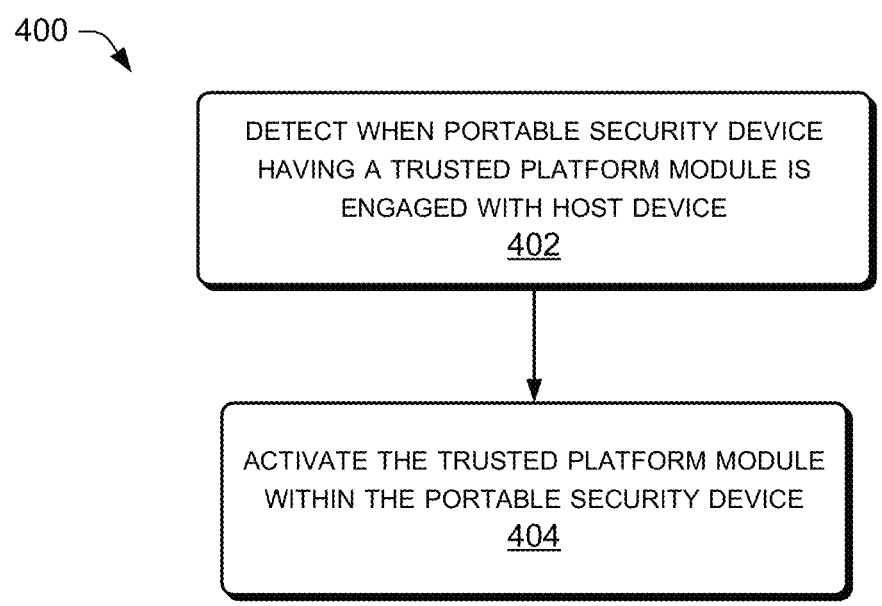
FIG. 4 is a diagram showing an example approach for activating a portable security device.
Figure 5:
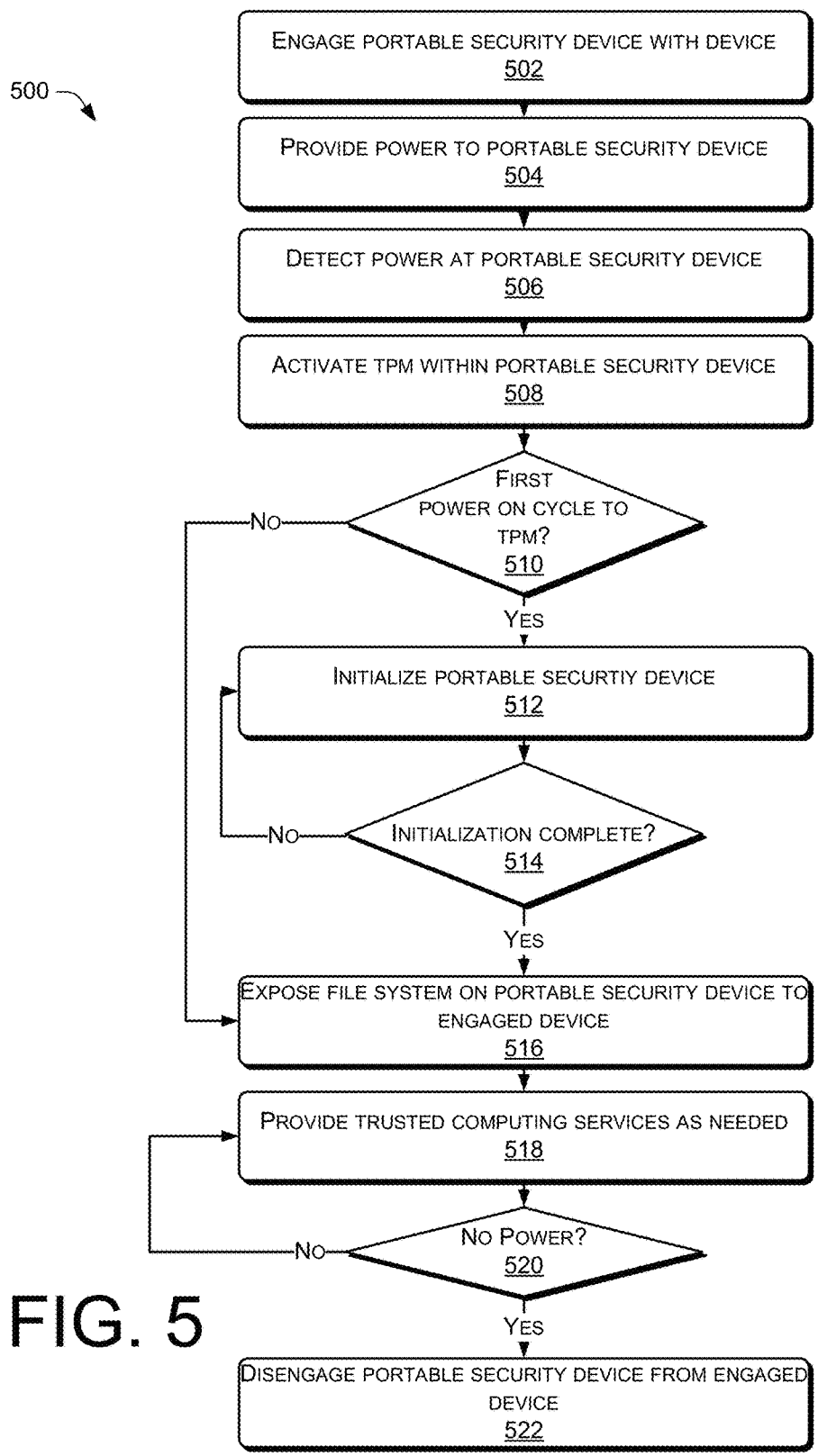
FIG. 5 is a diagram showing an example approach for operating a portable security device as described herein.
Figure 6:
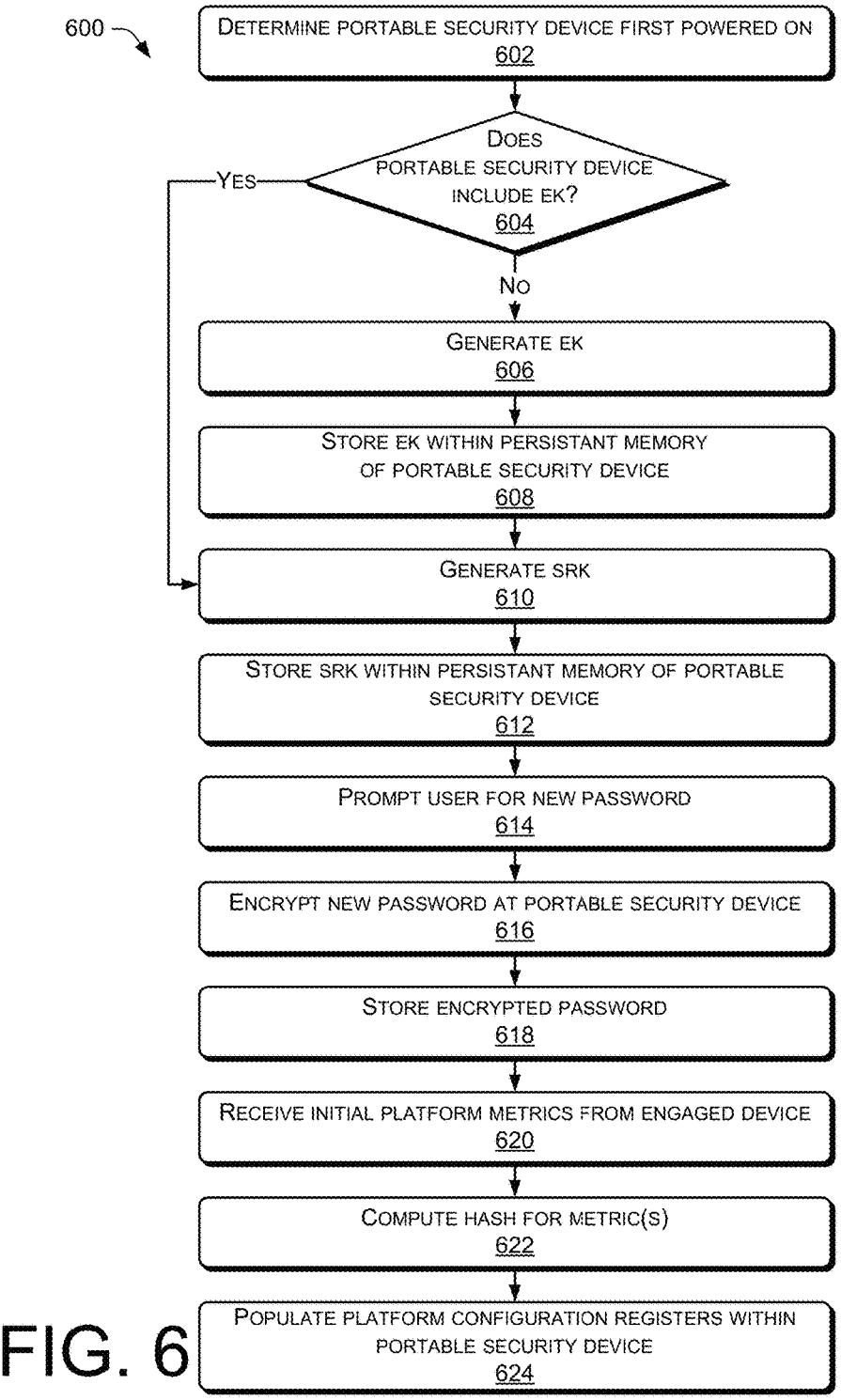
FIG. 6 is a diagram showing an example approach for initializing a portable security device as described herein.
Figure 7:
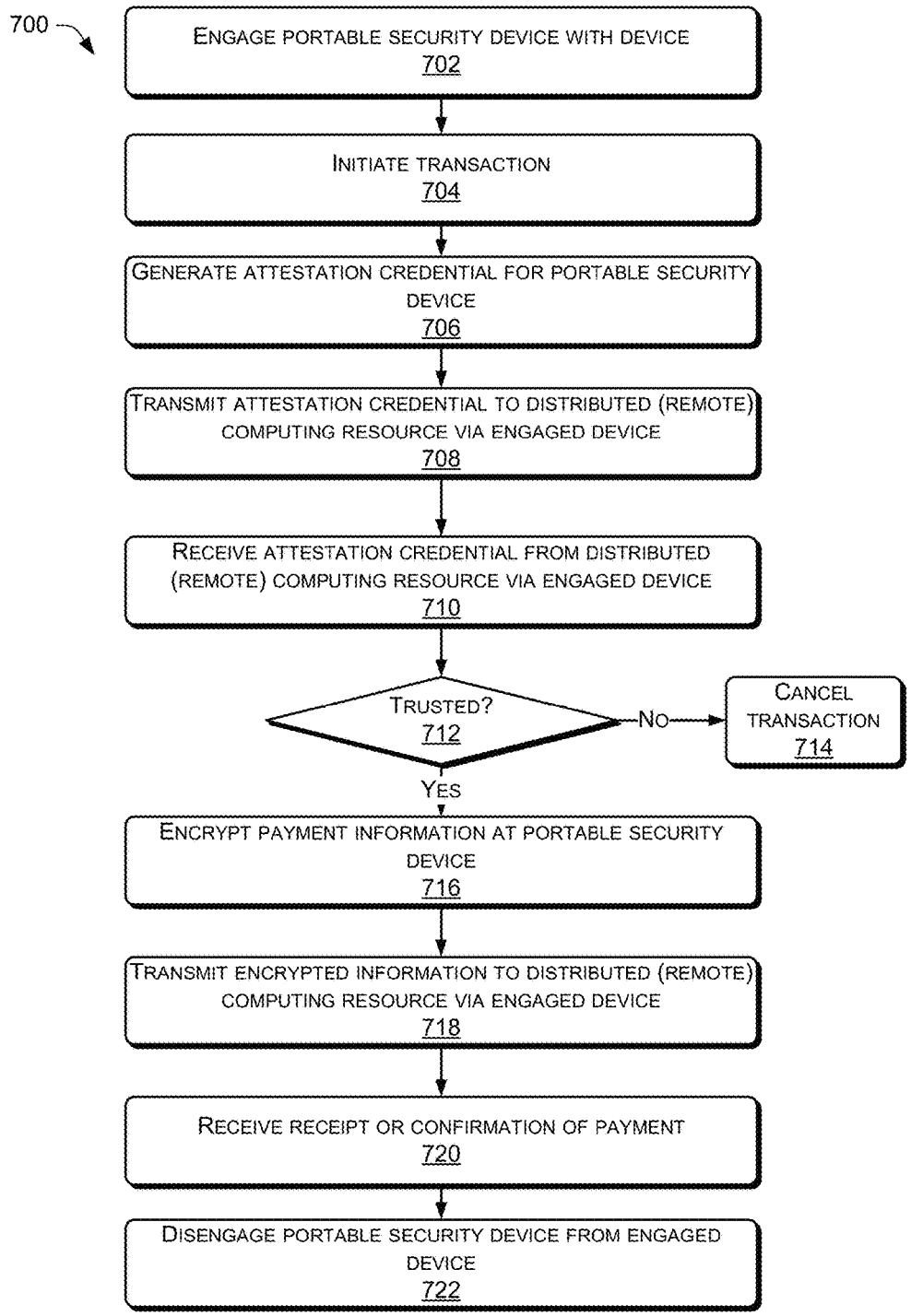
FIG. 7 is a diagram showing an example approach for conducting a secure transaction using a portable security device as described herein.
Figure 8:
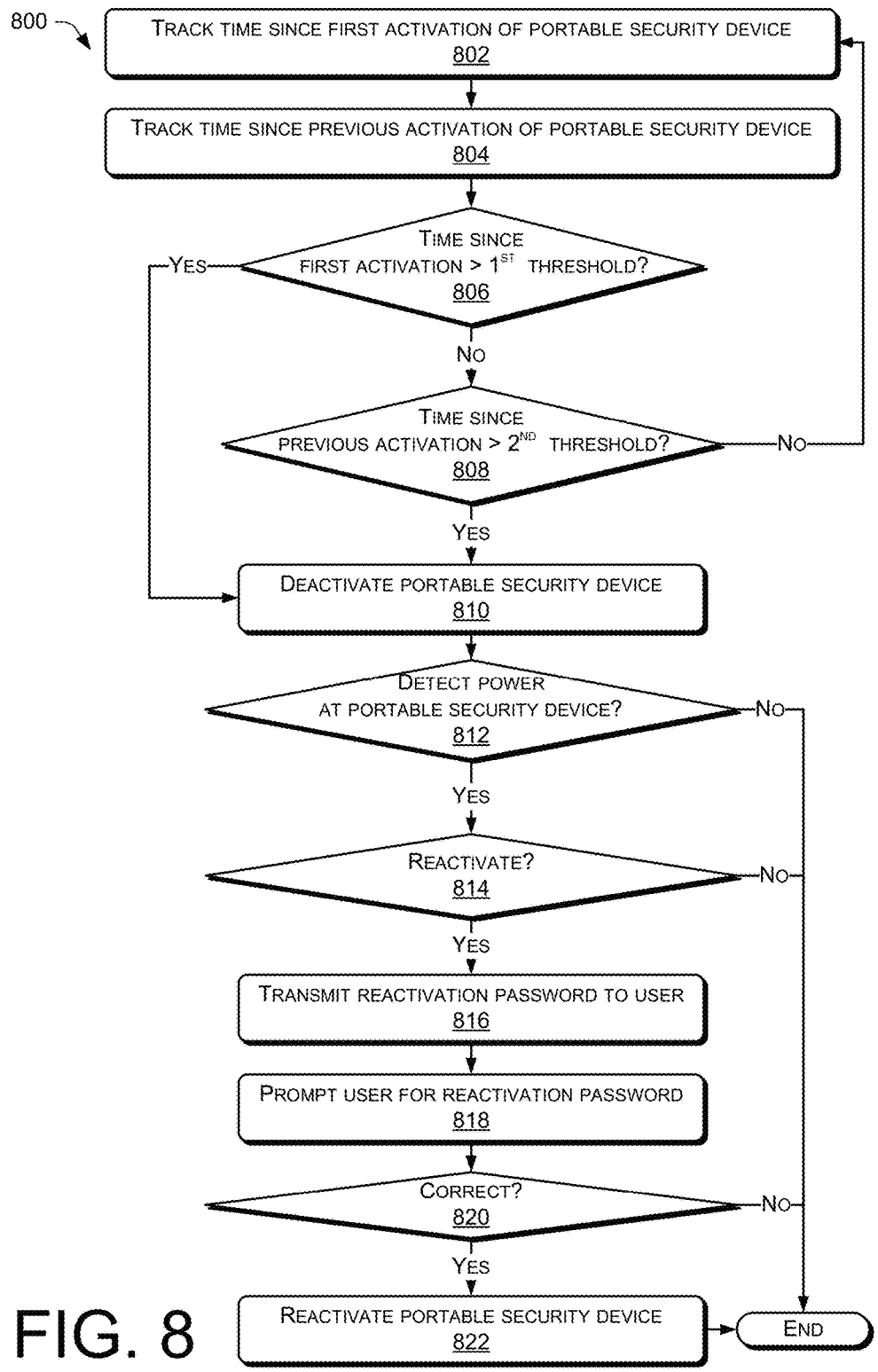
FIG. 8 is a diagram showing an example approach for deactivating a portable security device as described herein.

FIGS. 4 through 8 illustrate various processes associated with the portable security device 102. For example, FIG. 4 illustrates a flow diagram of a process to activate a portable security device. FIG. 5 illustrates a flow diagram of an example process to provide trusted computing services to an engaged device from a portable security device. FIG. 6 illustrates a flow diagram of a process to initialize a portable security device. FIG. 7 illustrates a process for completing a secured transaction with a distributed, or remote, computing resource using the portable security device engaged with a device. Moreover, FIG. 8 illustrates a process for deactivating a portable security device.

The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes can be implemented in a wide variety of other frameworks, architectures or environments.

The description of the various processes can include certain transitional language and directional language, such as "then," "next," "thereafter," "subsequently," "returning to," "continuing to," "proceeding to," etc. These words, and other similar words, are simply intended to guide the reader through the graphical illustrations of the processes and are not intended to limit the order in which the process steps depicted in the illustrations can be performed.

Additionally, one or more of the various process steps depicted in FIGS. 4 through 8 can be performed by the one or more devices 110 of the distributed computing resources 108, the computing devices 104, the portable security device 102, or a combination thereof in order to provide trusted platform computing services to an engaged device.

As stated above, FIG. 4 illustrates a flow diagram of an example process, designated 400, to activate a portable security device 102. Beginning at 402, the process 400 can include detecting when a portable security device, e.g., a portable security device, having a trusted platform module therein is engaged with a device such as device 104. For example, the portable security device can include power detection logic installed therein. The power detection logic can detect when the portable security device receives power from the device. As such, the power detection logic can determine when the portable security device is engaged with the device. As another example, when the portable security device includes a power supply, engagement logic can detect when the portable security device is engages with the device.

At 404, the process 400 can include activating the trusted platform module within the portable security device. For example, the trusted platform module can be activated in response to detecting that the portable security device is receiving power from the device and/or that the portable security device is engaged with the device. The portable security device can include activation/deactivation logic therein. The activation/deactivation logic can receive a signal from the power detection logic when the portable security device is engaged with the device. In turn, the activation/deactivation logic can transmit an activation signal to the TPM 208 within the portable security device 102.

FIG. 5 illustrates a flow diagram of an example process, designated 500, to provide trusted computing services to a device from a portable security device 102. Beginning at 502, the process 500 can include engaging a portable security device with a device. The portable security device can include the portable security device 102 described above in conjunction with FIG. 1. Further, the device can include one or more of the computing devices 104 described above in conjunction with FIG. 1. The portable security device can be engaged with the device by engaging an interface at the portable security device with a TPM interface at the device. This engagement can include a wired engagement provided by a mechanical couple, e.g., via a USB or another plug and socket arrangement. Additionally, the engagement can be provided by a wireless connection between the device and the portable security device. The wireless connection can be provided by a Wi-Fi link, a Bluetooth link, an NFC link, or a combination thereof.

At 504, the process 500 can include providing power to the portable security device. Power can be provided to the portable security device, e.g., by a battery therein. Alternatively, power can be provided to the portable security device from the device via the interface. At 506, the process 500 can include detecting power at the portable security device. Power detection logic within the portable security device can be used to detect when power is provided to the portable security device. At 508, the process can include activating the portable security device. In one aspect, activation/deactivation logic within the portable security device can receive a signal from the power detection logic. In turn, the activation/deactivation logic can transmit an activation signal to a TPM within the portable security device.

At 510, the process 500 can include determining whether the current power on cycle, or activation thereof, is a first power on cycle of the TPM. If the power on cycle is a first power on cycle, or a first activation, the process 500 can move to 512 and the process 500 can include initializing the portable security device. For example, the initialization of the portable security device can include generating the EK for the TPM, generating the SRK for the TPM, and populating the PCRs within the TPM. The initialization of the portable security device is described in greater detail below in conjunction with FIG. 6. At 514, the process 500 can include determining whether the initialization is complete. If the initialization of the TPM is not complete, the process 500 can return to 512 and continue as described. Otherwise, at 514, if the initialization of the TPM is complete, the process 500 can proceed to 516.

Returning to 510, if the current power on cycle is not a first power on cycle, or first activation, the process 500 can move directly to 516. At 516, the process 500 can include exposing the file system on the portable security device to the device. The file system on the portable security device can be exposed to a processor, an operating system, one or more software applications, one or more hardware devices, or a combination thereof within the engaged device. Further, the engaged device can access the file system on the portable security device via the connection established by the TPM interface of the device and the interface of the portable security device.

At 518, the portable security device can provide trusted computing services, i.e., trusted platform computing services, to the device. For example, the portable security device can provide secure generation of cryptographic keys, and can limit the use of such keys. The portable security device can provide a random number generator. The portable security device can also provide remote attestation and sealed storage. With respect to remote attestation, the portable security device can create a nearly unforgeable hash key summary of the hardware and software configuration of the engaged device based on certain metrics provided to the portable security device by the engaged device. The hash key summary can be provided to a third party to verify that the software has not been altered.

The portable security device can bind data by encrypting the data using a TPM bind key. The TPM bind key can include a unique cryptographic key, such as an RSA key, descended from a storage key. With respect to sealing, the portable security device can encrypt data using a similar process to the process that is used to bind data. However, the portable security device can further specify a state, or condition, associated with the portable security device and the portable security device can decrypt the encrypted data when the portable security device satisfies the state or condition.

In addition, various software program installed in the device to which the portable security device is engaged can use the portable security device to authenticate hardware components within the engaged device. Further, since the TPM within the portable security device includes a unique and secret cryptographic key, such as an RSA key, burned in as it is manufactured, the portable security device can perform platform authentication for the device. For example, the portable security device can be used to create a "chain of trust" and to remotely attest that a particular device has a particular specified hardware platform and is using particular specified software. Additionally, the portable security device can assure the integrity of a particular platform within an engaged device.

As such, the portable security device can ensure that the platform has not been compromised and can start a power-on boot process for the device from a trusted condition and extend this trust until the operating system has fully booted and applications are running. Together with the BIOS of the device, the portable security device can form a "root of trust." Specifically, the portable security device can utilize the PCRs therein in order to provide secure storage and reporting of security relevant platform metrics. These platform metrics can be used by the portable security device to detect changes to previous configurations of the platform of the device and derive decisions how to proceed during the boot cycle if errors or changes are detected.

Accordingly, the BIOS and the operating system can have the primary responsibility to utilize the portable security device in order to assure platform integrity. Thereafter, applications running on, and users of, the platform can rely on various security characteristics, such as secure input/output, uncompromised keyboard entries, uncompromised memory and storage operations, or a combination thereof. In another aspect, disk encryption applications can use the portable security device to protect the encryption keys used to encrypt the hard disk(s) within the engaged device and to provide integrity authentication for a trusted boot pathway, e.g., BIOS, boot sector, etc.

The portable security device can also be used to facilitate password protection. For example, the portable security device can provide a dedicated hardware module having a dictionary attack prevention mechanism therein. This dictionary attack prevent mechanism can substantially protect against guessing or automated dictionary attacks, while still allowing the user a sufficient and reasonable number of tries to input a correct password.

In other aspects, the portable security device can be used by the engaged device for digital rights management, protection and enforcement of software licenses, prevention of cheating in online games, secure transaction processing, secure banking, secure purchasing online, secure purchasing at a point of sale terminal, etc.

At 520, the process 500 can include determining whether the engaged device is no longer in a powered state, whether the portable security device is no longer in a powered state or no longer receiving power, or a combination thereof. If the power remains, the process 500 can return to 518 and the portable security device can continue to provide trusted computing services to the engaged device as needed. Otherwise, at 520, if the engaged device, the portable security device or a combination thereof is no longer powered, the process 500 can continue to 522 and the process 500 can include disengaging the portable security device from the device. The portable security device can be disengaged from the device by disengaging the interface on the portable security device from the TPM interface of the device. For example, the portable security device can be unplugged from the device. In another example, a wireless interface on the portable security device, the engaged device, or a combination thereof can be deactivated. Further, the portable security device can be moved out of range of the engaged device in order to disengage the portable security device from the engaged device.

FIG. 6 illustrates a flow diagram of a process 600 to initialize a portable security device. Beginning at 602 the portable security device receives power. At 604, the process 600 can include determining whether the portable security device includes an EK stored in the persistent memory of the TPM within the portable security device. This determination can be made by performing a read of the persistent memory of the TPM to determine if the persistent memory includes an EK generated during manufacture of the portable security device and stored thereon. If the portable security device does not include an EK, the process 600 can proceed to 606 and the process 600 can include generating an EK for the TPM.

In at least one example, the random number generator and key generator within the TPM of the portable security device can generate the EK. The EK can include a 2048-bit RSA private key. After the EK is generated, the process 600 can continue to 608 and the process can include storing the EK within the persistent memory of the TPM within the portable security device. In various examples, the EK can remain in the persistent memory of the TPM within the portable security device during the lifetime of the TPM without being revealed. To preserve the privacy of a user, the EK can be used to decrypt data, but not to encrypt data.

Returning to 604, if the portable security device does include an EK generated during manufacture of the TPM of the portable security device, the process 600 can move directly to 610. At 610, the process 600 can include generating an SRK for the TPM within the portable security device. In a particular aspect, the SRK can also be a 2048-bit private RSA key. The SRK can include a private portion and a public portion that can be generated using the random number generator and the RSA key generator within the TPM of the portable security device. For example, the random number generator can generate two random numbers and the RSA key generator can generate the public key and private key of the SRK from the two random numbers using the RSA algorithm that is well known in the field of cryptography. At 612, the SRK can be stored, or otherwise embedded, in the persistent memory of the TPM within the portable security device. The SRK can be used thereafter until the TPM is cleared. It can be appreciated that the TPM may not be cleared. However, if the TPM is cleared, a new SRK can be generated as described herein. In a particular aspect, the SRK can remain on the TPM without being revealed.

Moving to 614, the process 600 can include prompting a user for a new password. This password can be a system password for the device that is associated with the portable security device and the user of the device. At 616, the process can include encrypting the password received in response to the prompt. The encryption can take place within the portable security device. Thereafter, at 618, the process 600 can include storing the encrypted password within the portable security device. The encrypted password can be stored within the persistent memory of the TPM, the volatile memory of the TPM, or a combination thereof.

At 620, the process 600 can include receiving a plurality of initial platform metrics from the device. The platform metrics can be based on the current configuration of the platform and/or the current operation of the platform. Next, at 622, the process 600 can include computing a hash for each metric received from the device. In various examples, the hash generator within the cryptographic processor of the TPM within the portable security device can be used to compute a hash for each metric received from the device. At 624, the process 600 can include populating the PCRs within the volatile memory of the TPM within the portable security device with the hash values computed for each metric received from the device. As described above, the hash values computed for the metrics can be used while the TPM of the portable security device is providing trusted computing services to the engaged device in order to detect any changes from previous configurations in the engaged device and derive decisions on proceeding during a power on boot process if any changes have occurred.

FIG. 7 illustrates a process 700, for completing a secured transaction with a distributed, or remote, computing resource using the portable security device at an engaged device. Commencing at 702, the process 700 can include engaging the portable security device with the device. For example, the portable security device can be engaged with the device by engaging an interface at the portable security device with a TPM interface at the device. This engagement can include a wired engagement provided by a mechanical couple, e.g., via a USB connection or another plug and socket arrangement. Additionally, the engagement can be provided by a wireless connection between the device and the portable security device. The wireless connection can be provided by a Wi-Fi link, a Bluetooth link, an NFC link, or a combination thereof.

Moving to 704, the process 700 can include initiating a transaction. In a particular aspect, the transaction can be initiated with a distributed, or remote, computing resource accessed via the engaged device. For example, the transaction can include an online purchase, a banking transaction, a secure sign-on to a remote website, etc. The device can include a point-of-sale (POS) terminal, a dummy terminal, an automated teller machine, an electronic kiosk, some other computing device, or a combination thereof.

At 706, the process 700 can include generating an attestation credential for the portable security device. For example, the attestation credential can be generated using one of the AIKs stored in the volatile memory of the TPM within the portable security device. The attestation credential can be used to prove to the distributed, or remote, computing resource that the portable security device, and the engaged device are trusted. In various examples, the attestation credential can be encrypted. At 708, the process 700 can include transmitting the encrypted attestation credential for the portable security device to the distributed, or remote, computing resource. The encrypted attestation credential can be transmitted to the distributed, or remote, computing resource via the engaged device, e.g., over a network connection.

Moving to 710, the portable security device can receive an encrypted attestation credential from the distributed, or remote, computing resource. The encrypted attestation credential from the distributed, or remote, computing resource can be used to prove to the portable security device, and the user thereof, that the portable security device is communicating with a trusted distributed, or remote, computing resource. It can be appreciated that the encrypted attestation credential can be received at the portable security device via the engaged device, e.g., via a network connection.

At 712, the process 700 can determine whether the distributed, or remote, computing resource associated with the encrypted attestation credential received there from is trusted. This determination can include decrypting the encrypted attestation credential from the distributed, or remote, computing resource within the portable security device and reviewing the contents of the decrypted credential to determine whether the distributed, or remote, computing resource is also trusted. If the distributed, or remote, computing resource is not trusted, the process 700 can proceed to 714 and the process 700 can include canceling the transaction. The transaction can be canceled automatically by the portable security device to prevent any malicious intrusion into the portable security device and/or the engaged device. Conversely, the transaction can be canceled in response to an action received via an input/output interface, e.g., the toggling of a virtual cancel button presented via a graphical user interface associated with a website. After the transaction is canceled, the process 700 can end.

Returning to 712, if the distributed, or remote, computing resource is trusted, the process 700 can move to 716. At 716, the process 700 can include encrypting payment information, a password, other information, or a combination thereof within the portable security device. The encryption can be performed within the TPM of the portable security device using the SRK. Thereafter, at 718, the process 700 can include transmitting the encrypted information to the distributed, or remote, computing resource. The encrypted information can be transmitted to the distributed, or remote, computing resource via the device, e.g., a network connection thereof. At 720, the process 700 can include receiving a receipt or confirmation that the encrypted information was received at the distributed, or remote, computing resource. The receipt, or confirmation, can be an electronic receipt, or electronic confirmation, received at the portable security device via the engaged device, e.g., a network connection thereof.

At 722, the process 700 can include disengaging the portable security device from the engaged device. In a particular aspect, the portable security device can be disengaged from the engaged device by disengaging the interface on the portable security device from the TPM interface of the engaged device. For example, the portable security device can be unplugged from the engaged device. In another aspect, a wireless interface on the portable security device, the device, or a combination thereof can be deactivated. Further, the portable security device can be moved out of range of the device in order to disengage the portable security device from the device. After the portable security device is disengaged from the device, the process 700 can end.

FIG. 8 illustrates a process 800 for deactivating a portable security device. At 802, the process 800 can include tracking a time since first activation of the portable security device. The time since the first activation can be tracked using a counter or clock within the portable security device or by monitoring time stamps associated with each time the portable security device is activated or deactivated. Thereafter, at 804, the process 800 can include tracking a time since the previous activation of the portable security device. The time since the previous activation can be tracked using a counter or clock within the portable security device.

Moving to 806, the process 800 can include determining whether the time since the first activation of the portable security device is greater than a first predetermined threshold. This determination can be made by comparing the time since the first activation of the portable security device with the first predetermined threshold value to determine which is greater. If the time since the first activation of the portable security device is not greater than the first predetermined threshold, the process 800 can proceed to 808.

At 808, the process 800 can include determining whether the time since the previous activation of the portable security device is greater than a second predetermined threshold. This determination can be made by comparing the time since the previous activation of the portable security device with the second predetermined threshold value to determine which is greater. If the time since the previous activation of the portable security device is not greater than the second predetermined threshold, the process 800 can return to 802 and the process 800 can continue as described herein.

On the other hand, if the time since the previous activation of the portable security device is greater than the second predetermined threshold, the process 800 can proceed to 810. Returning to 806, if the time since the first activation of the portable security device is greater than the first predetermined threshold, the process 800 can proceed directly to 810. At 810, the process can deactivate the portable security device. The portable security device can be deactivated using the activation/deactivation logic within the TPM of the portable security device. For example, the activation/deactivation logic can be configured to transmit a deactivation signal to the TPM within the portable security device if either the first predetermined threshold or the second predetermined threshold is exceeded.

As such, if the time since the previous activation of the portable security device exceeds the second predetermined threshold, indicating that the portable security device is not being used (and thus, can be lost), the portable security device can be deactivated to prevent secure information on the portable security device from being compromised or to prevent another user attempting to use the portable security device for nefarious purposes. Further, if a user is only permitted to utilize the portable security device for a predetermined time period as determined by the provider of the portable security device, or the provider of a service affiliated with the portable security device, the portable security device can be deactivated after the time since the first activation of the portable security device is greater than the first predetermined threshold and the portable security device can no longer be used.

Returning to the description of FIG. 8, at 812, the process 800 can include determining whether power is detected at the portable security device. The power can be detected using the power detection logic within the controller of the portable security device. If power is detected, it can be an indication that portable security device has not been lost or that the user wishes to purchase further use of the portable security device. If the power is not detected at the portable security device, the process 800 can end. On the other hand, if power is detected at the portable security device, the process 800 can proceed to 814.

At 814, the process 800 can include determining whether to reactive the portable security device. For example, this determination can include simply prompting, e.g., via a display on the portable security device or associated with an engaged device and waiting for a response via an input device. Further, this determination can be based on contractual terms of use for the portable security device as determined by the provider of the portable security device, or the provider of services associated with the portable security device, and agreed to by the user. Further, there can a third predetermined threshold beyond which the portable security device is not available for reactivation. At 814, if it is determined not to reactivate the portable security device, the process 800 can end.

On the other hand, if at 814, it is determined to reactivate the portable security device, the process 800 can continue to 816 and the process 800 can include transmitting a reactivation password. For example, the reactivation password can be transmitted via an email associated with the portable security device, a text transmitted to a mobile telephone associated with the portable security device, or via some other form of communication that only the authorized entity can access. At 818, the process 800 can include prompting for the reactivation password. This prompt can be presented at the engaged device via a website. The reactivation password can be received in an appropriate input field and the engaged device can transmit the reactivation password to the provider of the portable security device, or the provider of a service affiliated with the portable security device, via a network connection. At 820, the process 800 can include determining whether the password received is correct. This determination can be made by comparing the character string received from the engaged device with the character string for the correct reactivation password. If the password is not correct, the process 800 can end. If the password is correct, the process 800 can proceed to 822 and the process 800 can include reactivating the portable security device. The portable security device can be reactivated upon receiving a reactivation signal transmitted from a remote computing resource via the engaged device. The reactivation signal can cause the activation/deactivation logic within the portable security device to transmit an activation signal to the TPM within the portable security device. Thereafter, the portable security device can be fully functional and the process 800 can end.

Example Clauses

A: A portable security device for a computing system, the device comprising: a housing; an interface at least partially disposed within the housing, wherein the interface is configured to be engaged with a plurality of different devices and to provide communication between the portable security device and an individual device of the plurality of different devices when engaged with the individual device; a trusted platform module (TPM) within the housing, wherein the TPM is coupled to the interface; and a controller within the housing, the controller coupled to the TPM and the interface, the controller including logic to detect when the portable security device is coupled to the individual device via the interface.

B: A portable security device as paragraph A recites, wherein the portable security device receives power from the device, in some instances via the interface when the portable security device is engaged with the individual device.

C: A portable security device as paragraph A or B recites, wherein the controller further comprises power detection logic to detect when the portable security device receives power.

D: A portable security device as any of paragraphs A through C recites, wherein the controller further comprises activation/deactivation logic configured to activate the TPM in response to detection of the portable security device receiving power.

E: A portable security device as any of paragraphs A through D recites, wherein the activation/deactivation logic is configured to deactivate the portable security device when a time since a first activation exceeds a first threshold.

F: A portable security device as any of paragraphs A through E recites, wherein the activation/deactivation logic is configured to deactivate the portable security device when a time since a previous activation exceeds a second threshold.

G: A portable security device as any of paragraphs A through F recites, wherein the TPM is configured to provide trusted platform computing services to the individual device when the portable security device is engaged with the individual device.

H. A method, comprising: detecting when a portable security device having a trusted platform module (TPM) therein is engaged with a device; and activating the TPM within the portable security device responsive to detecting the portable security device is engaged, the TPM of the portable device to provide hardware based security for the engaged device.

I: A method as paragraph H recites, further comprising: detecting that the TPM is activated for a first time; and initializing the TPM.

J. A method as paragraph H or I recites, wherein initializing the TPM includes: generating an endorsement key for the TPM; and storing the endorsement key within a persistent memory of the TPM.

K: A method as any of paragraphs H through J recites, wherein initializing the TPM includes: generating a storage root key for the TPM; and storing the storage root key within a persistent memory of the TPM.

L: A method as any of paragraphs H through K recites, further comprising: receiving a plurality of platform metrics from the device; computing a hash value for individual of the platform metrics; and storing the hash values in a platform configuration register within the TPM.

M: A method as any of paragraphs H through L recites, further comprising: ascertaining a time since a first activation of the TPM; determining if the time since the first activation is greater than a first predetermined threshold; and deactivating the TPM if the time since the first activation is greater than the first predetermined threshold.

N. A method as any of paragraphs H through M recites, further comprising: ascertaining a time since a previous activation of the TPM; determining if the time since the previous activation is greater than a second predetermined threshold; and deactivating the TPM if the time since the previous activation is greater than the second predetermined threshold.

O: A method as any of paragraphs H through L recites, further comprising: detecting power at the portable security device after the TPM is deactivated; receiving a reactivation instruction for the TPM; and reactivating the TPM within the portable security device.

P: A computer-readable medium having computer-executable instructions, the computer-executable instructions upon execution configuring a computer to perform a method as any of paragraphs H through O recites.

Q: An apparatus comprising: a processor coupled to a computer-readable medium having computer-executable instructions, the computer-executable instructions upon execution configuring a computer to perform a method as any of paragraphs H through O recites.

R: A computer-readable medium having thereon computer-executable instructions, the computer-executable instructions upon execution configuring a computer to perform operations comprising: activating a trusted platform module (TPM) within a portable security device; tracking a time since a first activation of the TPM within the portable security device; determining if the time since the first activation is greater than a first predetermined threshold; and deactivating the TPM if the time since the first activation is greater than the first predetermined threshold.

S: A computer-readable medium as paragraph R recites, further comprising: tracking a time since a previous activation of the TPM; determining if the time since the previous activation is greater than a second predetermined threshold; and deactivating the TPM if the time since the previous activation is greater than the second predetermined threshold.

T: A computer-readable medium as paragraph R or S recites, further comprising detecting power at the portable security device after the TPM is deactivated.

U: A computer-readable medium as any of paragraphs R through T recites, further comprising receiving a reactivation password for the TPM.

V: A computer-readable medium as any of paragraphs R through U recites, further comprising reactivating the TPM within the portable security device.

W: A device comprising a processor; and A computer-readable medium as any of paragraphs R through V recites.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes, or portions thereof, can be performed by resources associated with one or more device(s) 104, 106, 108, 130, 132, 134 such as one or more internal or external CPUs or GPUs, and/or one or more pieces of hardware logic such as FPGAs, DSPs, or other types of accelerators.

All of the methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," "might" or "can," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A portable security device for a computing system, the portable security device comprising:
    a housing;
    an interface at least partially disposed within the housing, wherein the interface is configured to be engaged with a plurality of different devices and to provide communication between the portable security device and an individual device of the plurality of different devices while engaged with the individual device;
    a trusted platform module (TPM) within the housing, wherein the TPM is coupled to the interface;
    a controller within the housing, the controller coupled to the TPM and the interface, the controller including logic configured to:
        detect whether the portable security device is coupled to the individual device via the interface;
        determine whether a time since a first activation of the portable security device exceeds a first threshold;
        determine whether a time since a previous activation of the portable security device exceeds a second threshold; and
    activation/deactivation logic configured to:
        deactivate the portable security device by transmitting a deactivation signal to the TPM in response to the time since the first activation exceeding the first threshold or the time since the previous activation exceeding the second threshold;

determine whether a time since the deactivation of the portable security device exceeds a third threshold beyond which the portable security device is not available for reactivation;

transmit a reactivation password associated with the portable security device in response to the time since the deactivation not exceeding the third threshold;

prompt for entry of the reactivation password associated with the portable security device; and reactivate the portable security device in response to determining that the entered reactivation password is correct.

2. The portable security device of claim 1, wherein the portable security device is configured to receive power from the individual device.

3. The portable security device of claim 1, wherein the controller further comprises power detection logic configured to detect whether the portable security device is receiving power.

4. The portable security device of claim 1, wherein the activation/deactivation logic is further configured to activate the TPM in response to detection of the portable security device receiving power.

5. The portable security device of claim 1, wherein the TPM is configured to provide trusted platform computing services to the individual device while the portable security device is engaged with the individual device.

6. A method, comprising:

detecting whether a portable security device having a trusted platform module (TPM) therein is engaged with a device;

activating the TPM within the portable security device responsive to detecting the portable security device is engaged, the TPM of the portable device configured to provide hardware based security for the engaged device;

ascertaining a time since a first activation of the TPM;

determining whether the time since the first activation of the portable security device is greater than a first threshold;

determining whether a time since a previous activation of the portable security device is greater than a second threshold in response to determining that the time since the first activation is not greater than the first threshold; and deactivating the TPM by transmitting a deactivation signal to the TPM in response to determining that the time since the first activation is greater than the first threshold or that the time since the previous activation is greater than the second threshold;

determining whether a time since deactivating the TPM exceeds a third threshold beyond which the TPM is not available for reactivation;

transmitting a reactivation password associated with the portable security device in response to the time since the deactivation not exceeding the third threshold;

prompting for entry of the reactivation password associated with the portable security device; and reactivating the TPM in response to determining that the entered reactivation password is correct.

7. The method of claim 6, further comprising:

detecting that the TPM is activated for a first time; and initializing the TPM in response to the TPM being activated for the first time.

8. The method of claim 7, wherein initializing the TPM includes:

generating an endorsement key for the TPM; and storing the endorsement key within a persistent memory of the TPM.

9. The method of claim 7, wherein initializing the TPM includes:

generating a storage root key for the TPM; and storing the storage root key within a persistent memory of the TPM.

10. The method of claim 6, further comprising:

receiving a plurality of platform metrics from the device;

computing a hash value for individual ones of the platform metrics; and storing the hash values in a platform configuration register within the TPM.

11. The method of claim 6, further comprising: ascertaining the time since the previous activation of the TPM.

12. The method of claim 6, further comprising:

detecting power at the portable security device after the TPM is deactivated.

13. A non-transitory computer-readable medium having thereon computer-executable instructions, the computer-executable instructions upon execution configuring a computer to perform operations comprising:

detecting whether a portable security device having a trusted platform module (TPM) therein is engaged with the computer;

activating the trusted platform module (TPM) within the portable security device;

tracking a time since a first activation of the TPM within the portable security device;

determining whether the time since the first activation of the portable security device is greater than a first threshold;

determining whether a time since a previous activation of the portable security device is greater than a second threshold in response to determining that the time since the first activation is not greater than the first threshold; and deactivating the TPM by transmitting a deactivation signal to the TPM in response to determining that the time since the first activation is greater than the first threshold or that the time since the previous activation is greater than the second threshold;

determining whether a time since deactivating the TPM exceeds a third threshold beyond which the TPM is not available for reactivation;

transmitting a reactivation password associated with the portable security device in response to the time since the deactivation not exceeding the third threshold;

prompting for entry of the reactivation password associated with the portable security device; and reactivating the TPM in response to determining that the entered reactivation password is correct.

14. The computer-readable medium of claim 13, further comprising:

tracking the time since the previous activation of the TPM.

15. The computer-readable medium of claim 14, further comprising detecting power at the portable security device after the TPM is deactivated.

* * * * *